United States Patent
Roy et al.

(10) Patent No.: US 11,587,427 B2
(45) Date of Patent: Feb. 21, 2023

(54) METHOD AND SYSTEM FOR PERFORMING REAL-TIME MONITORING OF A CONTAINER CONTAINING A NON-GASEOUS FLUID SUBSTANCE

(71) Applicant: Wipro Limited, Bangalore (IN)

(72) Inventors: Arindam Roy, Bangalore (IN); Adarsh Pattar, Bengaluru (IN)

(73) Assignee: Wipro Limited, Bangalore (IN)

( * ) Notice: Subject to any disclaimer, the term of this patent is extended or adjusted under 35 U.S.C. 154(b) by 0 days.

(21) Appl. No.: 16/988,922

(22) Filed: Aug. 10, 2020

(65) Prior Publication Data
US 2021/0375115 A1 Dec. 2, 2021

(30) Foreign Application Priority Data
May 26, 2020 (IN) .............................. 202041021950

(51) Int. Cl.
*G08B 21/18* (2006.01)
*G08B 27/00* (2006.01)
(Continued)

(52) U.S. Cl.
CPC ......... *G08B 21/182* (2013.01); *G08B 27/005* (2013.01); *H04L 67/12* (2013.01);
(Continued)

(58) Field of Classification Search
CPC ..... G08B 21/182; G08B 27/005; H04L 67/12; H04W 4/027; H04W 4/029; H04W 4/38
See application file for complete search history.

(56) References Cited

U.S. PATENT DOCUMENTS

| 8,249,829 B2 | 8/2012 | Vass et al. |
| 2013/0002443 A1* | 1/2013 | Breed .................. B65D 90/48 340/686.1 |

(Continued)

OTHER PUBLICATIONS

"Class-1 Division-2 Wireless Fuel Tank Gauging", B&B Electronics, available at https://www.bb-elec.com/Solutions/Energy-Natural-Resources/Petroleum,-Oil-and-Gas/Class-1-Division-2-Wireless-Fuel-Tank-Gauging.aspx (1 page).

(Continued)

*Primary Examiner* — James J Yang
(74) *Attorney, Agent, or Firm* — Finnegan, Henderson, Farabow, Garrett & Dunner, LLP (57) ABSTRACT

The disclosure relates to method and system for performing real-time monitoring of a container containing a non-gaseous fluid substance. The method includes receiving, from a sensing device installed in the container and by a monitoring device, a dataset corresponding to the container and to a non-gaseous fluid substance in the container. The dataset may be acquired and transmitted by the sensing device at a preconfigured time-interval and may include level data corresponding to a level of the non-gaseous fluid substance in the container, temperature data corresponding to a temperature inside the container, and movement data corresponding to movement of the container or a lid of the container. The method further includes performing, by the monitoring device, a time-series analysis on the dataset for determining an anomaly; and generating, by the monitoring device, a graded alert based on the anomaly.

16 Claims, 4 Drawing Sheets

(51) Int. Cl.
   *H04L 67/12*    (2022.01)
   *H04W 4/029*    (2018.01)
   *H04W 4/02*     (2018.01)
   *H04W 4/38*     (2018.01)

(52) U.S. Cl.
   CPC ........... *H04W 4/027* (2013.01); *H04W 4/029* (2018.02); *H04W 4/38* (2018.02)

(56) References Cited

U.S. PATENT DOCUMENTS

| | | | |
|---|---|---|---|
| 2014/0363084 A1 | 12/2014 | Tabb | |
| 2017/0263102 A1* | 9/2017 | Tshilombo | G01F 22/00 |
| 2018/0328775 A1* | 11/2018 | Gurumohan | G06F 17/15 |
| 2020/0072698 A1* | 3/2020 | Baird, IV | G01K 13/00 |

OTHER PUBLICATIONS

"Oil Tank Level Monitoring IoT Solution", https://www.biz4intellia.com/blog/oil-tank-level-monitoring-iot-solution/, Biz4Intelia (2019), 8 pages.

"Tank Level Monitoring", https://www.scadacore.com/applications/oil-and-gas-monitoring/tank-level-monitoring/, SCADACore, (2016-2020), 8 pages.

"Radar Level Measurement", https://new.siemens.com/us/en/products/automation/process-instrumentation/level-measurement/continuous/radar.html, Siemens USA (1996), 11 pages.

\* cited by examiner

METHOD AND SYSTEM FOR PERFORMING REAL-TIME MONITORING OF A CONTAINER CONTAINING A NON-GASEOUS FLUID SUBSTANCE

TECHNICAL FIELD

This disclosure relates generally to monitoring containers, and more particularly to method and system for performing real-time monitoring of a container containing a non-gaseous fluid substance.

BACKGROUND

Tanks and containers are commonplace in various sectors such as oil and gas industry, pharmaceutical industry, food and agriculture industry, remote well sites, and industrial farming sites. A large number of containers are commonly used in these sectors for storing oils, chemicals, and other non-gaseous fluids as raw materials or end products. The containers used in these sectors are often equipped with level gauge systems in order to assess condition of the containers by sensing level of content (e.g., non-gaseous fluid) in the containers. Conventional sensing techniques may include an image capturing technique (e.g., using camera) and/or a radio wave ranging technique (e.g., using ultrasonic sensor).

The conventional sensing techniques may provide the level of content in the container with fair accuracy. However, these conventional sensing techniques may fail to provide result with a desired accuracy in certain disruptive conditions. Examples of the disruptive conditions may include external contamination, tampering, and leakage due to wear and tear and/or due to chemical reactions, and so forth. Thus, the conventional sensing techniques may not be efficient enough in assessing the disruptive conditions as they capture information corresponding to the level of content in the container. Additionally, even level information is captured with a certain set of assumptions/conditions such as floating container lid must be visible to the camera (e.g., satellite camera) in order to capture its image, or the content in the container must be in a range of radio signals generated by the ultrasonic sensors. Therefore, it is desirable to provide a robust, efficient, and cost-effective mechanism that eliminates problems existing in the conventional techniques and provides accurate results even under such disruptive conditions.

SUMMARY

In an embodiment, a method of performing real-time monitoring of a container containing a non-gaseous fluid substance is disclosed. In one example, the method may include receiving, from a sensing device installed in the container, a dataset corresponding to the container and to a non-gaseous fluid substance in the container. The dataset may be acquired and transmitted by the sensing device at a preconfigured time-interval and may include level data corresponding to a level of the non-gaseous fluid substance in the container, temperature data corresponding to a temperature inside the container, and movement data corresponding to movement of the container or a lid of the container. The method may further include performing a time-series analysis on the dataset for determining an anomaly. The anomaly may include at least one of a leakage in the container, a contamination of the non-gaseous fluid substance in the container, an unauthorized activity with respect to the container, a drop in the level of the non-gaseous fluid substance in the container below a predefined upper level threshold, or a drop in the level below a predefined lower level threshold. The method may further include generating a graded alert based on the anomaly.

In another embodiment, a system for performing real-time monitoring of a container containing a non-gaseous fluid substance is disclosed. In one example, the system may include a monitoring device communicatively coupled to a sensing device installed in the container, The monitoring device may include a processor and a memory communicatively coupled to the processor, wherein the memory stores processor-executable instructions, which, on execution, causes the processor to receive, from the sensing device, a dataset corresponding to the container and to a non-gaseous fluid substance in the container. The dataset may be acquired and transmitted by the sensing device at a preconfigured time-interval and may include level data corresponding to a level of the non-gaseous fluid substance in the container, temperature data corresponding to a temperature inside the container, and movement data corresponding to movement of the container or a lid of the container. The processor-executable instructions, on execution, may further cause the processor to perform a time-series analysis on the dataset for determining an anomaly. The anomaly may include at least one of a leakage in the container, a contamination of the non-gaseous fluid substance in the container, an unauthorized activity with respect to the container, a drop in the level of the non-gaseous fluid substance in the container below a predefined upper level threshold, or a drop in the level below a predefined lower level threshold. The processor-executable instructions, on execution, may further cause the processor to generate a graded alert based on the anomaly.

In yet another embodiment, a non-transitory computer-readable storage medium, storing computer-executable instructions for performing real-time monitoring of a container containing a non-gaseous fluid substance is disclosed. The stored instructions, when executed by a processor, may cause the processor to perform operations including receiving, from a sensing device installed in the container, a dataset corresponding to the container and to a non-gaseous fluid substance in the container. The dataset may be acquired and transmitted by the sensing device at a preconfigured time-interval and may include level data corresponding to a level of the non-gaseous fluid substance in the container, temperature data corresponding to a temperature inside the container, and movement data corresponding to movement of the container or a lid of the container. The operations further include performing a time-series analysis on the dataset for determining an anomaly. The anomaly may include at least one of a leakage in the container, a contamination of the non-gaseous fluid substance in the container, an unauthorized activity with respect to the container, a drop in the level of the non-gaseous fluid substance in the container below a predefined upper level threshold, or a drop in the level below a predefined lower level threshold. The operations further include generating a graded alert based on the anomaly.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles.

DETAILED DESCRIPTION

Exemplary embodiments are described with reference to the accompanying drawings. Wherever convenient, the same reference numbers are used throughout the drawings to refer to the same or like parts. While examples and features of disclosed principles are described herein, modifications, adaptations, and other implementations are possible without departing from the spirit and scope of the disclosed embodiments. It is intended that the following detailed description be considered as exemplary only, with the true scope and spirit being indicated by the following claims. Additional illustrative embodiments are listed below.

Figure 1:
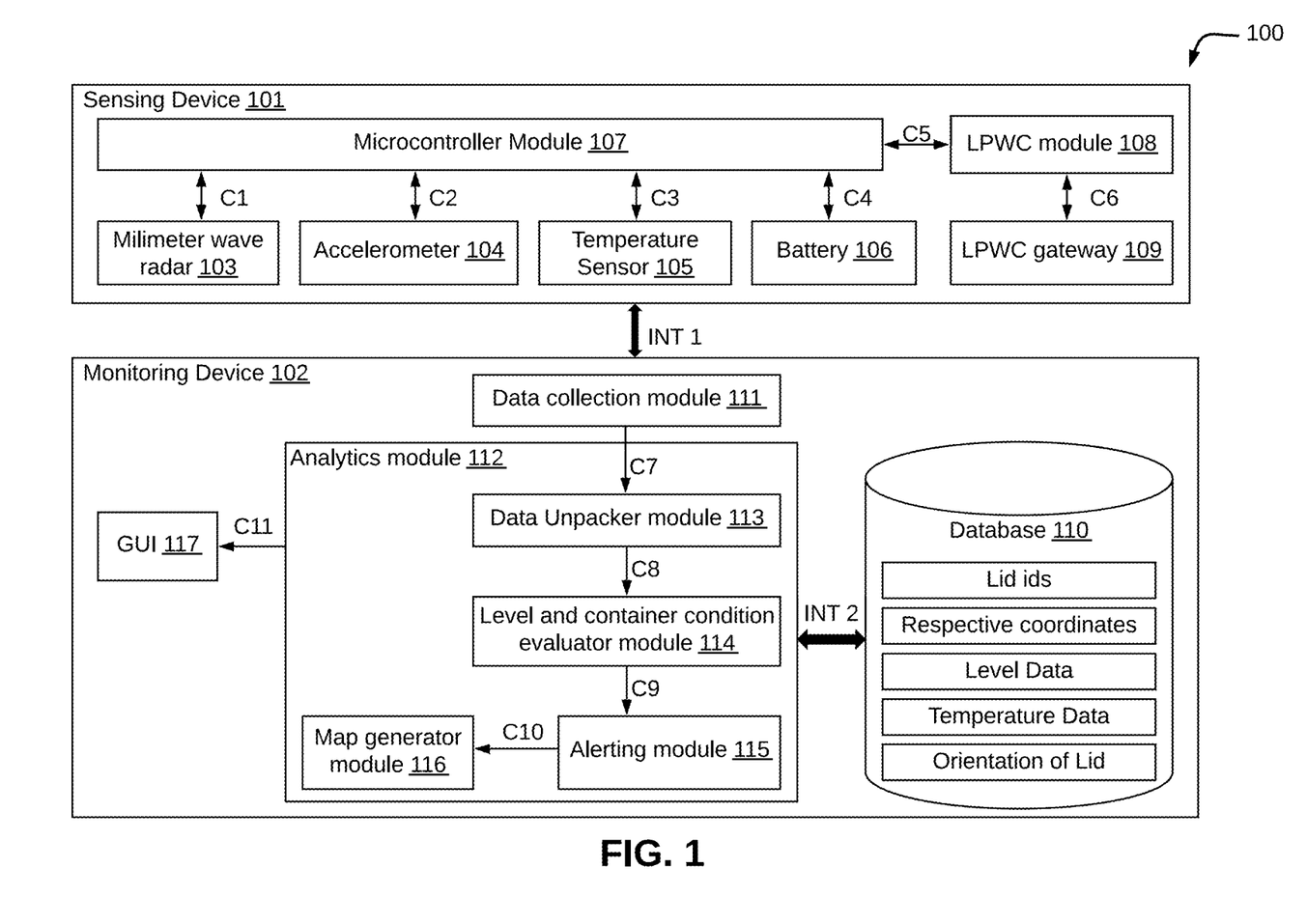
FIG. 1 is a functional block diagram of an exemplary system for performing real-time monitoring of a container containing a non-gaseous fluid substance, in accordance with some embodiments of the present disclosure.

Referring now to FIG. 1, a functional block diagram of an exemplary system 100 for performing real-time monitoring of a container containing a non-gaseous fluid substance is illustrated, in accordance with some embodiments of the present disclosure. The system 100 includes an exemplary sensing device 101 installed in the container (not shown) (e.g., oil storage tankers, large containers storing chemicals, etc.). The system 100 further includes an exemplary monitoring device 102 in communication with the sensing device 101. In some embodiments, the sensing device 101 may be mounted in an inner side of a lid of the container facing content (i.e., non-gaseous fluid) in the container. In some scenarios, there are multiple containers that need real-time monitoring. In such scenarios, each of the multiple containers may include a dedicated sensing device 101, which may be communicatively coupled to the monitoring device 102. The non-gaseous fluid substance may be any substance that can maintain a level in the container. Thus, in some embodiments, the non-gaseous fluid substance may include, but may not be limited to, liquid, semi-solid, liquified gas, semi-liquid, molten solid, and slurry.

The sensing device 101 and the monitoring device 102 may include various modules that perform various functions so as to perform real time monitoring of the container containing the non-gaseous fluid substance. In some embodiments, the sensing device 101 may include a millimeter wave radar 103, an accelerometer 104, a temperature sensor 105, a battery 106, a microcontroller module 107, a Low Power Wireless Communication (LPWC) module 108, and a LPWC gateway 109. In addition, the monitoring device 102 may include a data collection module 111, a database 110, an analytics module 112, a data unpacker module 113, a level and container condition evaluator module 114, an alerting module 115, a map generator module 116, and a Graphical User Interface (GUI) 117. As will be appreciated, the system 100 may also include various other modules than those mentioned above so as to perform real time monitoring and notification. Further, as will be appreciated by those skilled in the art, all such aforementioned modules 103-116 may be represented as a single module or a combination of different modules. Moreover, as will be appreciated by those skilled in the art, each of the modules 103-116 may reside, in whole or in parts, on one device or multiple devices in communication with each other.

The millimeter wave radar 103 may be used to determine a level of content inside the container. Considering the level of content determined by the millimeter wave radar 103 as one parameter, the system 100 may calculate dynamic volume of the container. In an embodiment, the container may also be referred as a tank. The millimeter wave radar 103 may correspond to a special class of radar technology that uses short wavelength electromagnetic waves. In addition, a size of component (such as antennas) required for processing of signals of the millimeter wave radar 103 may be small. The millimeter wave radar 103 may include a transmitter (Tx), a receiver (Rx), a radio frequency components, an analog components (example, a clock), a digital component (example an analog to digital convertor), a microcontroller, and a digital signal processor. The millimeter wave radar 103 may be connected to the microcontroller module 107 via connector 'C1'. The millimeter wave radar 103 may receive commands from the microcontroller module 107 via connector C1. Additionally, the millimeter wave radar 103 may send data of the Tx and the Rx to the microcontroller module 107 via connector C1.

The accelerometer 104 may correspond to a low gravity micro electromechanical system (i.e., low-g MEMS) accelerometers. The accelerometer 104 may be used for sensing a tilt corresponding to the container. The tilt may be detected based on a movement of the container or the movement of the lid of the container. In an embodiment, the accelerometer 104 may also be referred as an accelerometer sensor or a tilt sensor. The accelerometer 104 sensor may be connected to the microcontroller module via connector 'C2'. The accelerometer 104 may trigger and send an interrupt signal to the microcontroller module 107 whenever the tilt may be detected. The temperature sensor 105 may periodically analyze temperature values corresponding to the container. The temperature sensor 105 may be connected to the microcontroller module 107 via connector 'C3'.

The temperature sensor 105 may send the temperature values analyzed to the microcontroller module 107 via connector 'C3'. In addition, the temperature sensor 105 may receive a signal to on and off itself, from the microcontroller module 107. The battery 106 may correspond to a Lithium-Ion battery (e.g., Lithium-ion Ultralife® battery). It should be noted that, the Lithium-Ion battery may be used to avoid frequent replacement, as it may have a lifespan of up to 7-10 years.

The battery 106 may be connected to the microcontroller module 107 via connector 'C4'. The battery 106 may send on-board battery status to the microcontroller module 107 via connector 'C4'. In an embodiment, the on-board battery status may correspond to battery condition data. In addition, the battery 106 may receive signal to turn itself on and off from the microcontroller module 107 via connector 'C4'.

The microcontroller module 107 may correspond to a main controlling module with which the millimeter wave radar 103, the accelerometer 104, the temperature sensor 105, and the battery 106 may be connected. The microcontroller module 107 may generate a trigger to the millimeter wave radar 103 and/or other sensors for sensing level data and other associated data at a preconfigured time interval. In addition, the microcontroller module 107 may go on a sleep mode upon collecting and transmitting data at each preconfigured time interval. Moreover, the microcontroller module 107 may receive a trigger to wake up from the accelerometer 104 on detecting any unauthorized activity. The trigger to wake up the microcontroller module 107 may be generated by the accelerometer 104 using interrupt signal. In an embodiment, the unauthorized activity may be referred as an anomaly. In some embodiments, upon detecting the anomaly or upon receiving a trigger from the monitoring device 102, the microcontroller 107 may command the millimeter wave radar 103 and/or other sensors (i.e., the accelerometer 104 and the temperature sensor 105) for sensing and transmitting level data and other associated data at a shorter preconfigured time-interval as against the preconfigured time-interval (i.e., the standard or regular preconfigured time-interval). Thereafter, the microcontroller module 107 may generate an alert based on analytics performed on the dataset collected.

The LPWC module 108 may correspond to a Long-range (LoRa) spread-spectrum modulation module. The LPWC module 108 may be connected to the microcontroller module 107 via connector 'C5'. In an embodiment, the LPWC module 108 may receive 14 bytes of information data as well as 1 byte of alert information data from the microcontroller module 107. The 14 bytes of information data as well as 1 byte of alert information data may correspond to the dataset. The dataset may comprise level data corresponding to a level of the non-gaseous fluid substance in the container, temperature data corresponding to a temperature inside the container, and movement data corresponding to movement of the container or a lid of the container. Moreover, the LPWC module 108 may be connected to the LPWC gateway 109 via connector 'C6'. The LPWC module 108 may then transfer 14 byte of information data and 1 byte of alert information to the LPWC gateway 109 via connector 'C6'. In addition, the LPWC module 108 may sent 14 byte of information data and 1 byte of alert information to the monitoring device 102 using lower bandwidth via interface 'INT1'. The LPWC module 108 may be connected to the GUI 117 via interface 'INT1' in order to receive user inputs and configuration files. It should be noted that, the interface 'INT1' may correspond to a Wide Area Network (WAN) connection between the LPWC gateway 109 and the monitoring device 102. Thereafter, the LPWC module 108 may be configured to send user inputs and configuration files to the microcontroller module 107 via connector 'C5'.

In an embodiment, the monitoring device 102 may correspond to a server. The server may be a host machine through which data collection, processing and analysis may take place. As will be appreciated, the server might be a remote computer in control room and/or a third-party cloud storage. The database 110 may correspond to a storage unit. The database 110 may be used to access reference and historic data in order to perform analytics. Moreover, the database 110 may include IDs associated with the container (also referred as Lid IDs), respective coordinates of the containers, the accelerometer 104, the temperature sensor 105, and the battery 106 in order to know location of the container, previously measured level of the container (e.g., level data), temperature (also referred as temperature data), and orientation of the container or the lid of the container. The data collection module 111 may collect the dataset from the sensing device 101 over the LPWC gateway 109 via interface 'INT1'. The data collection module 111 may store the collected dataset in the database 110 and may also send the same to the analytics module 112. The dataset may comprise the level data corresponding to a level of the non-gaseous fluid substance in the container, the temperature data corresponding to the temperature inside the container, and movement data corresponding to movement of the container or a lid of the container. In an embodiment, the data collection module 111 may employ a lightweight protocol. Example of the lightweight protocol may include a Message Queuing Telemetry Transport (MQTT) client.

In an embodiment, the analytics module 112 may correspond to a main processing module deployed in the monitoring device 102. Moreover, the data unpacker module 113, the level and container condition evaluator module 114, the alerting module 115, and the map generator module 116 may be part of the analytics module 112. The data unpacker module 113 may be used to unpack the dataset. In addition, the level and container condition evaluator module 114 may also collect historical values from the database 110 via interface 'INT2'. It should be noted that, the interface 'INT 2' may be a database client application. Example of the database client application may include MySQL. The interface 'INT 2' may be configured to receive real time dataset from analytics module 112 and may send the dataset to the database 110 for storage. In addition, the interface 'INT 2' may also generate queries to the database 110 and may send responses of the queries to the analytical module 112. The historical values may be collected by employing combination logic estimated by the level and container condition evaluator module 114. The estimated combination logic may include but is not limited to checking whether the lid of the container is open or closed.

The alerting module 115 may collect the response for the queries analyzed from the level and container condition evaluator module 114 via connector 'C9'. It should be noted that, the connector 'C9' may be used to establish connection between the level and container condition evaluator module 114 and the alerting module 115. Based on the response collected from the level and container condition evaluator module 114, the alerting module 115 may generate a graded alert. The graded alert may be generated by classifying current condition of the container under inspection in a set of predefined alert categories. The set of predefined alert categories may include a high alert category (also referred as a red alert category), an intermediate alert category (also referred as a yellow alert category), and a no alert category (also referred as a green alert category). The map generator module 116 may be configured to receive results of the classification performed by the alerting module 115 via connector 'C10'. It should be noted that, the connector 'C10' may be used to establish connection between the alerting module 115 and the map generator module 116. In addition, the map generator module 116 may receive IDs corresponding to the container along with the coordinates associated with the container from the alerting module via the connector 'C10'. Thereafter, based on the results of classification and the IDs along with the associated coordinates, the map generator module 116 may generate an instant map representing site (also referred as location) of the container.

The GUI 117 may correspond to a user interface. The GUI 117 may be used to display the map to a user, representing the site of the container corresponding to the set of predefined alert category that may need immediate attention. In addition, the GUI 117 may allow the user to set sampling time for the millimeter wave radar 103. The GUI 117 may act as a front-end software unit. Example of the front-end software unit may include a dashboard in Azure Internet of Things (IoT) HUB platform. The GUI 117 may receive results generated by the analytics module 112 via connector 'C11'. It should be noted that, the connector 'C11' may be configured to receive result of the dataset processed by the analytics module 112. In addition, the GUI 117 may collect the user input, the configuration data from the user and may send them to the microcontroller module 107 via interface 'INT 1'.

It should be noted that all such aforementioned modules 103-117 of the sensing device 101 and the monitoring device 102 may be implemented in programmable hardware devices such as programmable gate arrays, programmable array logic, programmable logic devices, or the like. Alternatively, all such aforementioned modules 103-117 may be implemented in software for execution by various types of processors. An identified module of executable code may, for instance, include one or more physical or logical blocks of computer instructions which may, for instance, be organized as an object, procedure, function, or other construct. Nevertheless, the executables of an identified module need not be physically located together but may include disparate instructions stored in different locations which, when joined logically together, comprise the module and achieve the stated purpose of the module. Indeed, a module of executable code may be a single instruction, or many instructions, and may even be distributed over several different code segments, among different applications, and across several memory devices.

Figure 2:
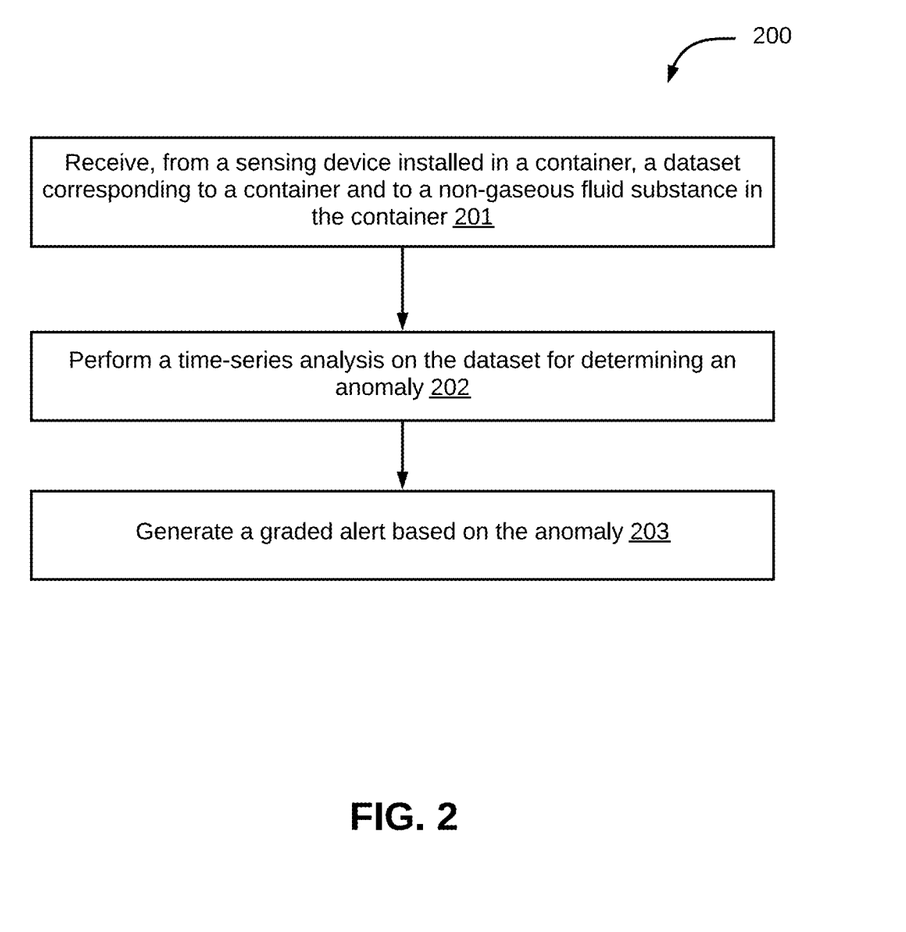
FIG. 2 is a flow diagram of an exemplary process for performing real-time monitoring of a container containing a non-gaseous fluid substance, in accordance with some embodiments of the present disclosure.

Referring now to FIG. 2, a flow diagram of an exemplary process for performing real-time monitoring of a container containing a non-gaseous fluid substance is depicted via a flowchart, in accordance with some embodiments of the present disclosure. At step 201, the monitoring device 102 may receive a dataset corresponding to the container and to the non-gaseous fluid substance in the container from a sensing device 101 installed in the container. In an embodiment, the non-gaseous fluid substance may correspond to any substance that can maintain a level in the container and may include a liquid substance, a semi-liquid substance, a liquified gas substance, a semi-liquid substance, a molten solid substance, and so forth. In addition, the dataset may be acquired and transmitted by the sensing device 101 at a preconfigured time-interval. The dataset may include at least level data corresponding to a level of the non-gaseous fluid substance in the container, temperature data corresponding to a temperature inside the container, and movement data corresponding to movement of the container or a lid of the container. Moreover, in some embodiments, the sensing device 101 may generate the dataset by packing the level data, the temperature data, and the movement data based on a predefined data packing schema. In such embodiments, the monitoring device 102 may unpack the received dataset in order to extract the level data, the temperature data, and the movement data based on the predefined data packing schema.

As stated above, the sensing device 101 may include a plurality of sensors to acquire the dataset. In particular, the sensing device 101 may include a millimetre wave radar 103 to capture the level data, a temperature sensor 105 to capture the temperature data, and an accelerometer 104 or a tilt sensor to capture the movement data. Additionally, in some embodiments, the sensing device 101 may be installed in an inner side of the lid of the container facing the non-gaseous fluid substance. Further, in some embodiments, the sensing device 101 may be a battery-operated device. In such embodiments, the dataset may further include battery condition data. As stated above, in some embodiments, the sensing device 101 may transmit the dataset to the monitoring device 102 via a power efficient Long Range (LoRa) wireless communication network.

At step 202, the monitoring device 102 may perform a time-series analysis on the dataset for determining an anomaly. In some embodiments, the anomaly may include at least one of a leakage in the container, a contamination of the non-gaseous fluid substance in the container, an unauthorized activity with respect to the container, a drop in the level of the non-gaseous fluid substance in the container below a predefined upper level threshold, or a drop in the level below a predefined lower level threshold. In some embodiments, the leakage may be determined based on at least the level data. Additionally, in some embodiments, the contamination may be determined based on the level data and at least one of the temperature data and the movement data. Further, in some embodiments, the unauthorized activity (e.g., tampering) may be determined based on at least one of the temperature data and the movement data. Moreover, in some embodiments, the drop in the level may be determined based on at least the level data.

At step 203, the monitoring device 102 may generate a graded alert based on the anomaly detected. In some embodiments, the graded alert may be generated by classifying the anomaly into one of a set of predefined alert categories. The set of predefined alert categories may include at least a high alert category, an intermediate alert category, and a no alert category. In some embodiments, the anomaly may be categorized into the high alert category based on at least one of the leakage, the contamination, or the drop in the level below the predefined lower level threshold. Additionally, in some embodiments, the anomaly may be categorized into the intermediate alert category based on at least one of the unauthorized activity, and the drop in the level below the predefined upper level threshold but not below the predefined lower level threshold. Further, in some embodiments, the anomaly may be categorized into the no alert category when the anomaly is not determined or when the level is above the predefined upper level threshold.

In some embodiments, the monitoring device 102 may trigger the sensing device 101 to increase a frequency of acquisition and transmission of the dataset from a regular preconfigured time-interval to a shorter preconfigured time-interval, upon classifying the anomaly into one of the high alert category or the intermediate alert category. Additionally, in some embodiments, the monitoring device 102 may determine a location of the container based on a sensing device identifier in the dataset. Alternatively or additionally, in some embodiments, the monitoring device 102 may determine a location of the container based on LoRA signal based positioning technique or location data from a global positioning system (GPS) sensor. It should be noted that, in embodiments where GPS sensor is used, the GPS sensor may be a part of the sensing device 101 (not shown in FIG. 1) or may be located in proximity to the container (for example, in the truck carrying oil tanker). Such arrangement will ensure that there is no power load on the battery of the sensing device due to GPS sensor. Further, in such embodiments, the monitoring device 102 may generate a map representing a shortest path to reach the container based on the graded alert and the location of the container.

Figure 3:
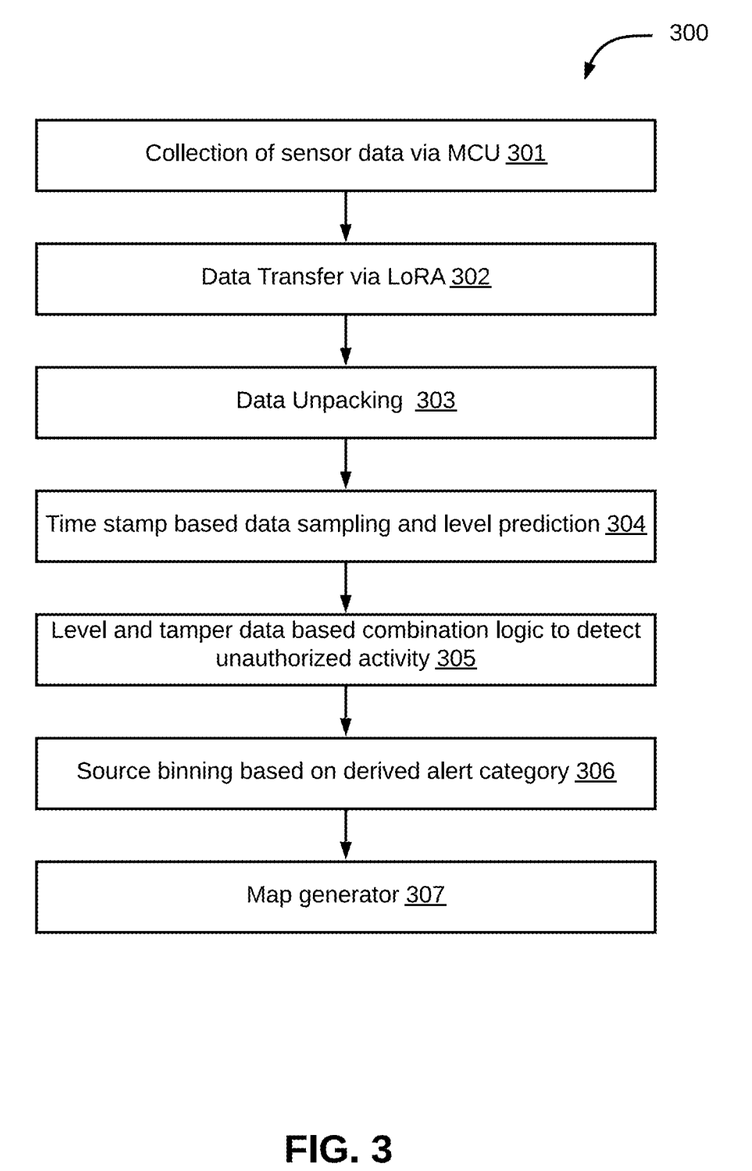
FIG. 3 is a flow diagram of a detailed exemplary process overview for performing real-time monitoring of a container containing a non-gaseous fluid substance, in accordance with some embodiments of the present disclosure.

Referring now to FIG. 3, a flow diagram of a detailed exemplary process overview for performing real-time monitoring of a container containing a non-gaseous fluid substance is depicted via a flowchart, in accordance with some embodiments of the present disclosure. At step 301, the dataset may be collected by the microcontroller module 107 of the sensing device 101. The dataset may also be referred as sensor data. In this step, the microcontroller module 107 may communicate with the millimeter wave radar 103 in order to gauge the level of content in the container periodically. It should be noted that, the microcontroller module 107 may act as a master device and the millimeter wave radar 103 may act as a slave device. The microcontroller module 107 may trigger the millimeter wave radar 103 to transmit a unidirectional chirp signal. Based on the unidirectional chirp signal transmitted, the millimeter wave radar 103 may capture signals reflected by an object in its path. Thereafter, a total time taken may be determined by the millimeter wave radar 103 based on sending of the chirp signal and receiving of reflected signal after hitting a content of the container along with a speed of the chirp signal. In an embodiment, the content of the container may correspond to the non-gaseous fluid substance. It should be noted that, the speed of the chirp signal may be same as a speed of light. Based on the total time calculated, the microcontroller module 107 may calculate distance between the millimeter wave radar 103 of the sensing device 101 mounted on the lid of the container and current level of the content of the container. Moreover, the current level of the content of the container may be determined based on a difference of the distance calculated by the microcontroller module 107 and a height of the container.

In addition, the microcontroller module 107 may command the millimeter wave radar 103 to work in one of two modes i.e., a regular mode and an interrupt mode. In the regular mode, the microcontroller module 107 command the millimeter wave radar 103 to collect the level data of the content of the container at a specific interval of time 'T'. In an embodiment, the specific time period 'T' may correspond to the regular preconfigured time-interval. By way of an example, the specific time period 'T' may be in hours, i.e., say after every one hour the millimeter wave radar 103 may collect the level data of the content of the container. Moreover, in the regular mode, the millimeter wave radar 103 and the microcontroller module 107 may go to sleep after collecting and transmitting the dataset in order to save on-board battery power. In the interrupt mode, the microcontroller module 107 may receive the trigger from the accelerometer 104 whenever the tilt may be detected by the accelerometer 104. On detecting the tilt, the sensing device 101 may classify event at that particular time instance as an 'unauthorized activity'. The sensing device 101 may send the interrupt signal to the millimeter wave radar 103 to wake up. On receiving the interrupt signal, the microcontroller module 107 may command the millimeter wave radar 103 and the temperature sensor 105 to capture the dataset corresponding to the container for the shorter predefined time-interval. The dataset may be captured at the shorter predefined time-interval in order to collect as much information as possible corresponding to the container, in order to arrive at better and dynamic insights associated with condition of the container. By way of an example, the shorter predefined time-interval may be in minutes, i.e., say after every 5 minutes or 10 minutes the millimeter wave radar 103 may collect the level data of the content of the container.

The accelerometer 104 may be used for sensing the tilt corresponding to the container. The tilt may be sensed based on the movement of the container or the movement of the lid of the container. The accelerometer 104 may be connected to the microcontroller module 107 of the sensing device 101, and the sensing device 101 may be mounted on the lid of the container. Therefore, whenever anybody tries to displace or remove the lid of the container having the sensing device 101 attached to it, the attached accelerometer 104 of the sensing device 101 may immediately capture the tilt based on the movement of the lid of the container. The tilt may be captured with respect to local earth horizontal plane. The accelerometer 104 may measure projection of a gravity vector on a sensing axis. It should be noted that, the amplitude of an acceleration sensed may change according to a sine angle between the sensing axis and the local earth horizontal plane. In an embodiment, a tilt angle may correspond to a ratio of an acceleration change vector recorded to that of a gravity vector. Thereafter, the tilt angle measured may be send by the accelerometer 104 to the microcontroller module 107. In addition, the microcontroller module 107 may send the interrupt signal to the millimeter wave radar 103 and the temperature sensor 105 to notify that the unauthorized activity has been detected. Thereafter, the microcontroller module 107 may capture the dataset corresponding to that container more aggressively. In addition, the microcontroller module 107 may start to buzz an alarm in order to notify or to alert a crew member.

Moreover, the microcontroller module 107 may receive the temperature data (also referred as temperature reading) at the preconfigured time-interval from the temperature sensor 105 of the sensing device 101. In an embodiment, the temperature sensor 105 may correspond to an integrated circuit (IC) temperature sensor. The IC temperature sensor may rely on the predictive temperature dependence of a silicon band gap. The IC temperature sensor may result in the determination of the temperature data corresponding to the container. The IC temperature sensor may include a precision current sources, an internal forward-biased P-N junction, and a resulting base-to-emitter voltage change ($\Delta VBE$). It should be noted that, the base-to-emitter voltage measured may result in the temperature data recorded by the temperature sensor 105 for the preconfigured time-interval.

Additionally, the microcontroller module 107 may receive the battery condition data corresponding to the battery 106 of the sensing device 101. The battery condition data may include battery discharge rate and current status of the battery 106. Moreover, the microcontroller module 107 may receive the battery condition data at the preconfigured time-interval. In addition, the microcontroller module 107 may go on a sleep mode upon collecting and transmitting dataset at each preconfigured time-interval. The microcontroller module 107 may go on the sleep mode by enabling a power off mode corresponding to the millimeter wave radar 103, the accelerometer 104, and the temperature sensor 105. The power off mode may be enabled in order to save power of the battery 106 of the sensing device 101.

At step 302, the dataset captured by the microcontroller module 107 may be transferred to the LPWC module 108. In an embodiment, the LPWC module 108 may correspond to a LoRa module. The LPWC module 108 may transfer the dataset captured to the LPWC gateway 109. The LPWC gateway 109 may transfer the dataset captured to the monitoring device 102. Moreover, the dataset captured may correspond to the 14 byte information data and 1 byte alert information data corresponding to the container. By way of an example, the 14 byte alert information data transferred by the microcontroller device 107 may include a set of fields. The set of fields may include a byte1 indicating the battery discharge rates. A byte2 indicating the temperature data of the container. A byte3 indicating the level data measured by the millimeter wave radar 103. A byte4 used to enable and disable a Bluetooth flag. The microcontroller module 107 may also send the 1 byte alert information data to the monitoring device 102. The 1 byte alert information may indicate the movement corresponding to the container or lid of the container (also referred as the tilt) and the battery condition information. It should be noted that, the Lora module may send the dataset to the monitoring device 102 using a wide area network (WAN). In addition, the LoRa module may also collect user data (e.g., an input configuration files) and may transfer it to the microcontroller module 107 via wired connection. Thereafter, the microcontroller module 107 may use the user input to set sampling interval in order to increase or decrease a radio wave power in order to get accurate dataset.

At step 303, the data unpacker module 111 may receive the dataset from the LoRa module via WAN. In other words, the data unpacker module 111 may receive 14 byte of information data and 1 byte of alert information data. It should be noted that, the data unpacker module 111 may comprise of a light-weight client protocol for collecting and storing the dataset received from the LoRa module. The dataset collection comprises of the level data, the temperature data, the movement data, and the battery condition data. In other words, the dataset received may be divided into four fields (i.e., the level data, the temperature data, the movement data, and the battery condition data). In addition, each of the four fields comprising the dataset may be stored in four local buffers. Thereafter, the four local buffers may be shared with the level and container condition evaluator module 114 for further processing.

At step 304, timestamp-based data sampling and level prediction may be done corresponding to the content of the container. The level and container condition evaluator module 114 may receive the four local buffers containing the level data, the temperature data, the movement data, and the battery condition data. Thereafter, the level data may be used to judge current status of the container (i.e., the current level of the container). The level and container condition evaluator module 114 may estimate a distance between the sensing device 101 and the current level of the content of the container. The current level of the content of the container may be determined by considering position of the sensing device 101 at an origin (0, 0). Moreover, the current level of the content in the container may be estimated by the level and container condition evaluator module 114 based on the difference of the distance measured by the millimeter wave radar 103 and the height of the container. Thereafter, the current level of the content in the container (denoted as 'L') may be stored in the database 110 against a current time interval 'T', along with a temperature information 'T0'.

The level and container condition evaluator module 114 may extract a set of successive container level corresponding to the container along with a set of associated timestamps from the database 110. The level and container condition evaluator module 114 may then calculate a decremental change (denoted as 'δ') corresponding to the level of the content in the container by subtracting two successive tank levels (i.e., 'L1' and 'L2'). Thereafter, the level and container condition evaluator module 114 may estimate or predict a time required (denoted by 'Tr') for the level of the content in the container to go from the current level (i.e., 'L1') to a red zone level ('V). In an embodiment, the red zone level may correspond to the high alert category. It should be noted that, the red zone level may correspond to a level of the content inside the container that may reach extreme low level and may require immediate refill. The time 'Tr' may be determined based on a ratio of a level of the content remaining between the current level (i.e., 'L1') to the red zone level (i.e., 'Lr') and the incremental change 'δ' as per equation (1) given below:

$$Tr = T*(L1-Lr)/(\delta) \quad \text{Equation (1)}$$

In equation (1), 'T' represents time required for the decremental change 'δ', 'Lr' represents the level of the content in the container at the red zone level, and 'L1' represents the level of the content in the container at a yellow zone level (also referred as the intermediate alert category). It should be noted that, the 'Lr' and the 'L1' may calculated in centimeters. 'Tr' may represent time remaining to reach the red zone level. It should be noted that, the time 'Tr' may be calculated in hours.

At step 305, combination logic, based on the level and the tamper data, may be used to detect an unauthorized activity. The unauthorized activity may correspond to the anomaly. The dataset may comprise the level data corresponding to the level of the non-gaseous fluid substance in the container, the temperature data corresponding to the temperature inside the container, and the movement data corresponding to the movement of the container or the lid of the container. The anomaly may include at least one of the leakage in the container, the contamination of the non-gaseous fluid substance in the container, the unauthorized activity with respect to the container, the drop in the level of the non-gaseous fluid substance in the container below the predefined upper level threshold, or the drop in the level below a predefined lower level threshold. In an embodiment, in order to detect the anomaly, the combination logic-based method may be employed. The system 100 may predict condition of the container with help of successive levels of the container, the temperature data and the movement data record during each measurement along with the timestamps. The sensing device 101 on board may capture the temperature inside the container, the movement of the container or the lid of the container (also referred as tilt), and the level of the container successively in a form of the dataset. The dataset captured may be stored in the database 110. The system 100 may assign two dynamic thresholds for the level of content inside the container, i.e., a 'δl' indicating a lower threshold level of the container (also referred as the predefined lower level threshold) and a 'δu' indicating an upper threshold level of the container (also referred as the predefined upper level threshold). It should be noted that, the dynamic thresholds assigned may be configured based on requirements of the user. Once the dataset is captured, the system 100 may classify the anomaly in category comprising at least one of a leakage in the container, a contamination in the container, and a suspicion of the unauthorized activity.

In order to classify the anomaly in the leakage of the container category, the system 100 may fetch a few sets of measured levels (i.e. the level data) corresponding to the container observed during successive interval 'T'. Thereafter, the system 100 may classify the anomaly as the leakage, based on monitoring of a difference between two successive levels corresponding to the container that may not be constant. Based on monitoring of the difference that may not be constant, the system 100 may indicate that rate of change of the container level may not be constant and may be random due to the leakage in the container. In order to classify the anomaly in the contamination of the container category, the system 100 may fetch the dataset comprising the few set of measured levels, the temperature data, and the movement data (i.e., tilt angles) from the database 110. Moreover, each of the few set of measured levels, the temperature data, and the movement data may be observed during successive interval 'T'. Thereafter, the container may be classified as contaminated when successive change in the temperature observed along with successive change in the tilt angles and the difference between two successive levels may not constant. Moreover, the contamination may happen due to external agents. By way of an example, the external agents may include, but is not limited to, a tampering of the sensing device 101 mounted on the lid of the container or due to indeterministic data captured by the millimeter wave radar 103 over several intervals.

In addition, the container may be classified as contaminated when successive change in the temperature observed along with the difference between two successive levels may not be constant. Moreover, the system 100 may classify container as contaminated or possibly leaking due to chemical reaction that may happen inside the container. By way of an example, the system 100 may classify container as contaminated based on the level data and the temperature data of the container that may be changing randomly due to the chemical reaction that may happen inside the container. Additionally, the container may be classified as contaminated when successive change in the tilt angle and the difference between two successive levels may not be constant. Based on monitoring of the tilt angle and the difference between two successive levels, the system 100 may conclude that the contamination may have occurred due to external tampering or container lid left open. By way of an example, the level of the container may be changing randomly as the content might be evaporating or accidental addition of external matter due to which the contamination may happen. Moreover, the system 100 may classify the anomaly in suspicion of the unauthorized activity category when there is change in the temperature of site or there is change in the tilt angle but the change in the level of the container may be fixed. Based on the change in the temperature of site (i.e., location of the container) or the change in the tilt angle, the system 100 may indicate that there may be external tampering or increase in the temperature due to natural or internal chemical reaction.

At step 306, source binning may be done based on the derived alert category. In this step, the container under observation may be classified into one of the predefined set of categories. The set of predefined alert categories may include at least the high alert category, the intermediate alert category, and the no alert category. The container may be categorized in the high alert category (also referred as the red alert category) when the leakage in the container is detected, the contamination in the container is detected, or the drop in the level may be below the predefined lower level threshold. In the red alert category, the system 100 may indicate a crew member to take immediate action. The container may be categorized in the intermediate alert category (also referred as the yellow alert category) on determining the unauthorized activity, and the drop in the level below the predefined upper level threshold but not below the predefined lower level threshold. In the yellow alert category, the system 100 may indicate the crew member keep the container under observation in order to collect more data corresponding to the container over time. The container may be categorized in the no alert category (also referred as the green alert category) when the anomaly may not be determined or when the level may be above the predefined upper level threshold. In the green alert category, the system 100 may indicate the crew member that the site is under control and no actions may be required. In addition, the system 100 may increase efficiency of monitoring the container from a regular preconfigured time-interval to a shorter preconfigured time-interval on detecting the high alert category or the intermediate alert category. By way of an example, the system 100 may usually monitor the container for the regular preconfigured time-interval, say, every 1 hour. On detecting the high alert category, the system 100 may start monitoring the container for the shorter preconfigured time-interval, say, every 5 minutes. In addition, on detecting the intermediate alert category, the system 100 may start monitoring the container for the shorter predefined time-interval, say, every 15 minutes.

At step 307, a map may be generated corresponding to the location of the container on detecting the high alert category or the intermediate alert category. The location of the container may be determined based on one of a sensing device identifier (e.g. Lid ID) in the dataset, LoRA signal based positioning technique, and location data from a global positioning system (GPS) sensor. The GPS sensor may be a part of the sensing device 101 or may be located in proximity to the container. The map generator module 116 may receive the container ID and the alert category. By way of an example, the map generator module 116 may receive a container ID 'idx' corresponding to the container categorized in the high alert category. The map generator module 116 may then fetch physical coordinates of the container from the database 110. The container ID and associated coordinates may be stored in two local buffers, example, buffer_idx and buffer_xy respectively. The map generator module 116 may then generate dynamic map corresponding to the container categorized in the high alert category. The map may be generated by assuming local control (where site crew operates) as starting point to the location of the container via buffer_idx and buffer_xy. The map may be generated considering a shortest path to reach the location of the container from the starting point. In an embodiment, the map may be generated based on a generic algorithm. Examples of the generic algorithm may include a Euclidean distance or a Dijkstra's Shortest Path First algorithm. Similarly, the map may be generated corresponding to the containers categorized in the intermediate alert category. Thereafter, the generated map may be sent to the GUI 117, so that Crew member may visualize and get current map in order to perform necessary actions corresponding to a condition of the container.

Figure 4:
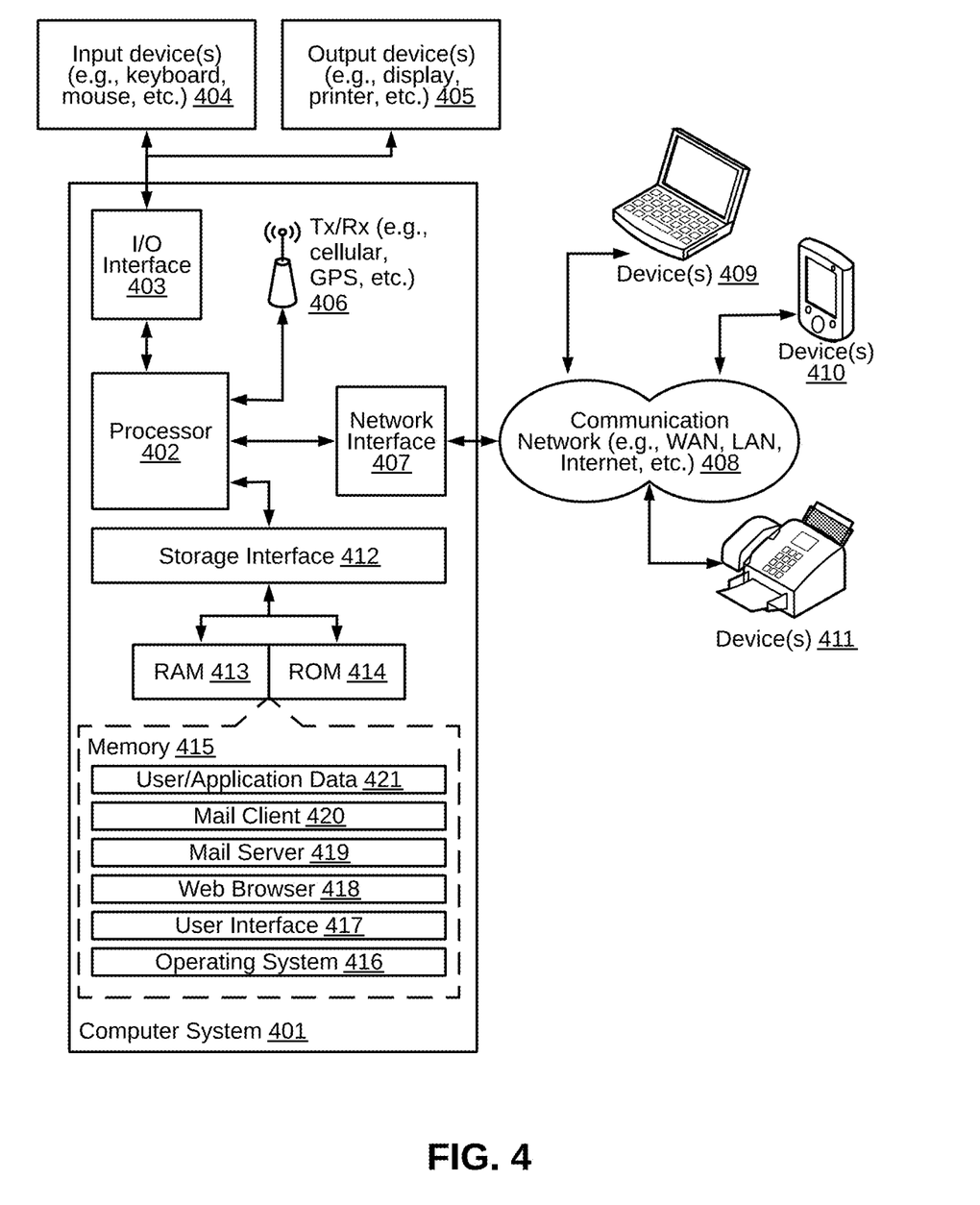
FIG. 4 illustrates a block diagram of an exemplary computer system for implementing embodiments consistent with the present disclosure.

The disclosed methods and systems may be implemented on a conventional or a general-purpose computer system, such as a personal computer (PC) or server computer. Referring now to FIG. 4, a block diagram of an exemplary computer system 401 for implementing various embodiments is illustrated. Computer system 401 may include a central processing unit ("CPU" or "processor") 402. Processor 402 may include at least one data processor for executing program components for executing user-generated or system-generated requests. A user may include a person, a person using a device such as those included in this disclosure, or such a device itself. Processor 402 may include specialized processing units such as integrated system (bus) controllers, memory management control units, floating point units, graphics processing units, digital signal processing units, etc. Processor 402 may include a microprocessor, such as AMD® ATHLOM® microprocessor, DURON® microprocessor OR OPTERON® microprocessor ARM's application, embedded or secure processors, IBM® POWERPC®, INTEL'S CORE® processor, ITANIUM® processor, XEON® processor, CELERON® processor or other line of processors, etc. Processor 402 may be implemented using mainframe, distributed processor, multi-core, parallel, grid, or other architectures. Some embodiments may utilize embedded technologies like application-specific integrated circuits (ASICs), digital signal processors (DSPs), Field Programmable Gate Arrays (FPGAs), etc.

Processor 402 may be disposed in communication with one or more input/output (I/O) devices via an I/O interface 403. I/O interface 403 may employ communication protocols/methods such as, without limitation, audio, analog, digital, monoaural, RCA, stereo, IEEE-1394, serial bus, universal serial bus (USB), infrared, PS/2, BNC, coaxial, component, composite, digital visual interface (DVI), high-definition multimedia interface (HDMI), RF antennas, S-Video, VGA, IEEE 802.n/b/g/n/x, Bluetooth, cellular (for example, code-division multiple access (CDMA), high-speed packet access (HSPA+), global system for mobile communications (GSM), long-term evolution (LTE), WiMax, or the like), etc.

Using I/O interface 403, computer system 401 may communicate with one or more I/O devices. For example, an input device 404 may be an antenna, keyboard, mouse, joystick, (infrared) remote control, camera, card reader, fax machine, dongle, biometric reader, microphone, touch screen, touchpad, trackball, sensor (for example, accelerometer, light sensor, GPS, gyroscope, proximity sensor, or the like), stylus, scanner, storage device, transceiver, video device/source, visors, etc. An output device 405 may be a printer, fax machine, video display (for example, cathode ray tube (CRT), liquid crystal display (LCD), light-emitting diode (LED), plasma, or the like), audio speaker, etc. In some embodiments, a transceiver 406 may be disposed in connection with processor 402. Transceiver 406 may facilitate various types of wireless transmission or reception. For example, transceiver 406 may include an antenna operatively connected to a transceiver chip (for example, TEXAS® INSTRUMENTS WILINK WL1286® transceiver, BROADCOM® BCM4550IUB8® transceiver, INFINEON TECHNOLOGIES® X-GOLD 618-PMB9800® transceiver, or the like), providing IEEE 802.6a/b/g/n, Bluetooth, FM, global positioning system (GPS), 2G/3G HSDPA/HSUPA communications, etc.

In some embodiments, processor 402 may be disposed in communication with a communication network 408 via a network interface 407. Network interface 407 may communicate with communication network 408. Network interface 407 may employ connection protocols including, without limitation, direct connect, Ethernet (for example, twisted pair 10/100/1000 Base T), transmission control protocol/internet protocol (TCP/IP), token ring, IEEE 802.11a/b/g/n/x, etc. Communication network 408 may include, without limitation, a direct interconnection, local area network (LAN), wide area network (WAN), wireless network (for example, using Wireless Application Protocol), the Internet, etc. Using network interface 407 and communication network 408, computer system 401 may communicate with devices 409, 410, and 411. These devices 409, 410, and 411 may include, without limitation, personal computer(s), server(s), fax machines, printers, scanners, various mobile devices such as cellular telephones, smartphones (for example, APPLE® IPHONE® smartphone, BLACKBERRY® smartphone, ANDROID® based phones, etc.), tablet computers, eBook readers (AMAZON® KINDLE® reader, NOOK® tablet computer, etc.), laptop computers, notebooks, gaming consoles (MICROSOFT® XBOX® gaming console, NINTENDO® DS® gaming console, SONY® PLAYSTATION® gaming console, etc.), or the like. In some embodiments, computer system 401 may itself embody one or more of these devices 409, 410, and 411.

In some embodiments, processor 402 may be disposed in communication with one or more memory devices (for example, RAM 413, ROM 414, etc.) via a storage interface 412. Storage interface 412 may connect to memory 415 including, without limitation, memory drives, removable disc drives, etc., employing connection protocols such as serial advanced technology attachment (SATA), integrated drive electronics (IDE), IEEE-1394, universal serial bus (USB), fiber channel, small computer systems interface (SCSI), etc. The memory drives may further include a drum, magnetic disc drive, magneto-optical drive, optical drive, redundant array of independent discs (RAID), solid-state memory devices, solid-state drives, etc.

Memory 415 may store a collection of program or database components, including, without limitation, an operating system 416, user interface application 417, web browser 418, mail server 419, mail client 420, user/application data 421 (for example, any data variables or data records discussed in this disclosure), etc. Operating system 416 may facilitate resource management and operation of computer system 401. Examples of operating systems 416 include, without limitation, APPLE® MACINTOSH® OS X platform, UNIX platform, Unix-like system distributions (for example, Berkeley Software Distribution (BSD), FreeBSD, NetBSD, OpenBSD, etc.), LINUX distributions (for example, RED HAT®, UBUNTU®, KUBUNTU®, etc.), IBM® OS/2 platform, MICROSOFT® WINDOWS® platform (XP, Vista/7/8, etc.), APPLE® IOS® platform, GOOGLE® ANDROID® platform, BLACKBERRY® OS platform, or the like. User interface 417 may facilitate display, execution, interaction, manipulation, or operation of program components through textual or graphical facilities. For example, user interfaces 417 may provide computer interaction interface elements on a display system operatively connected to computer system 401, such as cursors, icons, check boxes, menus, scrollers, windows, widgets, etc. Graphical user interfaces (GUIs) may be employed, including, without limitation, APPLE® Macintosh® operating systems' AQUA® platform, IBM® OS/2® platform, MICROSOFT® WINDOWS® platform (for example, AERO® platform, METRO® platform, etc.), UNIX X-WINDOWS, web interface libraries (for example, ACTIVEX® platform, JAVA® programming language, JAVASCRIPT® programming language, AJAX® programming language, HTML, ADOBE® FLASH® platform, etc.), or the like.

In some embodiments, computer system 401 may implement a web browser 418 stored program component. Web browser 418 may be a hypertext viewing application, such as MICROSOFT® INTERNET EXPLORER® web browser, GOOGLE® CHROME® web browser, MOZILLA® FIREFOX® web browser, APPLE® SAFARI® web browser, etc. Secure web browsing may be provided using HTTPS (secure hypertext transport protocol), secure sockets layer (SSL), Transport Layer Security (TLS), etc. Web browsers 418 may utilize facilities such as AJAX, DHTML, ADOBE® FLASH® platform, JAVASCRIPT® programming language, JAVA® programming language, application programming interfaces (APIs), etc. In some embodiments, computer system 401 may implement a mail server 419 stored program component. Mail server 419 may be an Internet mail server such as MICROSOFT® EXCHANGE® mail server, or the like. Mail server 419 may utilize facilities such as ASP, ActiveX, ANSI C++/C#, MICROSOFT .NET® programming language, CGI scripts, JAVA® programming language, JAVASCRIPT® programming language, PERL® programming language, PHP® programming language, PYTHON® programming language, WebObjects, etc. Mail server 419 may utilize communication protocols such as internet message access protocol (IMAP), messaging application programming interface (MAPI), Microsoft Exchange, post office protocol (POP), simple mail transfer protocol (SMTP), or the like. In some embodiments, computer system 401 may implement a mail client 420 stored program component. Mail client 420 may be a mail viewing application, such as APPLE MAIL® mail-client, MICROSOFT ENTOURAGE® mail client, MICROSOFT OUTLOOK® mail client, MOZILLA THUNDERBIRD® mail client, etc.

In some embodiments, computer system 401 may store user/application data 421, such as the data, variables, records, etc. as described in this disclosure. Such databases may be implemented as fault-tolerant, relational, scalable, secure databases such as ORACLE® database OR SYBASE® database. Alternatively, such databases may be implemented using standardized data structures, such as an array, hash, linked list, struct, structured text file (for example, XML), table, or as object-oriented databases (for example, using OBJECTSTORE® object database, POET® object database, ZOPE® object database, etc.). Such databases may be consolidated or distributed, sometimes among the various computer systems discussed above in this disclosure. It is to be understood that the structure and operation of the any computer or database component may be combined, consolidated, or distributed in any working combination.

It will be appreciated that, for clarity purposes, the above description has described embodiments of the invention with reference to different functional units and processors. However, it will be apparent that any suitable distribution of functionality between different functional units, processors or domains may be used without detracting from the invention. For example, functionality illustrated to be performed by separate processors or controllers may be performed by the same processor or controller. Hence, references to specific functional units are only to be seen as references to suitable means for providing the described functionality, rather than indicative of a strict logical or physical structure or organization.

Various embodiments of the invention provide method and system for performing real-time monitoring of a container containing a non-gaseous fluid substance. The method and system may receive a dataset corresponding to the container and to a non-gaseous fluid substance in the container. The method and system may then perform a time-series analysis on the dataset for determining an anomaly. Thereafter, the method and system may generate a graded alert based on the anomaly. The benefit of the invention is that, this invention may reduce downtime up to 30%. The present invention may provide complete insights about the container as well its content's health. Moreover, the present invention may improve machine's utilization. In addition, the present invention may derive accurate result about the condition of the container based on multiple integrated sensors and combination logic. Also, with help of the present invention, installation of the sensors may be quick and easy as it may just require replacing existing container lid with another lid of a same size comprising the sensors. In addition, any kind of cable connection or complex wireless infrastructure may not be required for installing the sensors. Moreover, the present invention may be more efficient, improved and easy to use.

The specification has described method and system for performing real-time monitoring of a container containing a non-gaseous fluid substance. The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope and spirit of the disclosed embodiments.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include random access memory (RAM), read-only memory (ROM), volatile memory, nonvolatile memory, hard drives, CD ROMs, DVDs, flash drives, disks, and any other known physical storage media.

It is intended that the disclosure and examples be considered as exemplary only, with a true scope and spirit of disclosed embodiments being indicated by the following claims.

What is claimed is:

1. A method of performing real-time monitoring of a container containing a non-gaseous fluid substance, the method comprising:
  receiving, from a plurality of sensors in a sensing device installed in a container and by a monitoring device, a dataset corresponding to the container and to a non-gaseous fluid substance in the container,
    wherein the dataset is acquired and transmitted by the sensing device at a preconfigured time-interval,
    wherein the dataset is generated by the sensing device by packing the level data, the temperature data, and the movement data based on a predefined data packing schema,
    wherein the sensing device transmits the dataset to the monitoring device via a Long Range (LoRa) wireless communication module,
    wherein the dataset comprises level data corresponding to a level of the non-gaseous fluid substance in the container, temperature data corresponding to a temperature inside the container, and movement data corresponding to movement of the container or a lid of the container, and
    wherein receiving the dataset comprises unpacking the dataset to extract the level data, the temperature data, and the movement data based on the predefined data packing schema using a light-weight client protocol; and
  performing, by the monitoring device, a time-series analysis on the dataset for determining an anomaly, wherein the anomaly comprises at least one of a leakage in the container, a contamination of the non-gaseous fluid substance in the container, an unauthorized activity with respect to the container, a drop in the level of the non-gaseous fluid substance in the container below a predefined upper level threshold, or a drop in the level below a predefined lower level threshold, wherein the unauthorized activity with respect to the container is detected when there is a change in the temperature inside the container or there is a change in tilt angle of the lid of the container and a change in the level of the non-gaseous fluid substance in the container remains constant;

generating, by the monitoring device, a graded alert based on the anomaly, by classifying the anomaly into one of a set of predefined alert categories;

determining a location of the container based on a sensing device identifier in the dataset, a Long Range (LoRA) signal based positioning technique, and location data from a global positioning system (GPS) sensor; and generating a map representing a shortest path to reach the container based on the graded alert and the location of the container.

2. The method of claim 1, wherein the plurality of sensors comprises a millimetre wave radar to capture the level data, a temperature sensor to capture the temperature data, and an accelerometer or a tilt sensor to capture the movement data.

3. The method of claim 1, wherein the sensing device is installed in an inner side of the lid of the container facing the non-gaseous fluid substance.

4. The method of claim 1, wherein the sensing device is a battery-operated device, and wherein the dataset further comprises battery condition data.

5. The method of claim 1, wherein the leakage is determined based on at least the level data, the contamination is determined based on the level data and at least one of the temperature data and the movement data, the unauthorized activity is determined based on at least the movement data, the drop in the level is determined based on at least the level data.

6. The method of claim 1, wherein generating the graded alert comprises classifying the anomaly into one of a set of predefined alert categories, wherein the set of predefined alert categories comprises at least a high alert category, an intermediate alert category, and a no alert category, and wherein classifying comprises:

categorizing the anomaly into the high alert category based on at least one of the leakage, the contamination, or the drop in the level below the predefined lower level threshold;

categorizing the anomaly into the intermediate alert category based on at least one of the unauthorized activity, and the drop in the level below the predefined upper level threshold but not below the predefined lower level threshold; and categorizing the anomaly into the no alert category when the anomaly is not determined or when the level is above the predefined upper level threshold.

7. The method of claim 1, further comprising triggering the sensing device to increase a frequency of acquisition and transmission of the dataset from the preconfigured time-interval to a shorter preconfigured time-interval, upon classifying the anomaly into one of the high alert category or the intermediate alert category.

8. The method of claim 1, wherein the GPS sensor is a part of the sensing device or located in proximity to the container.

9. A system for performing real-time monitoring of a container containing a non-gaseous fluid substance, the system comprising:

a monitoring device communicatively coupled to a sensing device installed in a container, the monitoring device comprising a processor and a memory communicatively coupled to the processor, wherein the memory stores processor-executable instructions, which, on execution, causes the processor to:

receive, from a plurality of sensors in the sensing device, a dataset corresponding to the container and to a non-gaseous fluid substance in the container,
wherein the dataset is acquired and transmitted by the sensing device at a preconfigured time-interval,
wherein the dataset is generated by the sensing device by packing the level data, the temperature data, and the movement data based on a predefined data packing schema,
wherein the sensing device transmits the dataset to the monitoring device via a Long Range (LoRa) wireless communication module,
wherein the dataset comprises level data corresponding to a level of the non-gaseous fluid substance in the container, temperature data corresponding to a temperature inside the container, and movement data corresponding to movement of the container or a lid of the container, and
wherein receiving the dataset comprises unpacking the dataset to extract the level data, the temperature data, and the movement data based on the predefined data packing schema using a lightweight client protocol; and perform a time-series analysis on the dataset for determining an anomaly, wherein the anomaly comprises at least one of a leakage in the container, a contamination of the non-gaseous fluid substance in the container, an unauthorized activity with respect to the container, a drop in the level of the non-gaseous fluid substance in the container below a predefined upper level threshold, or a drop in the level below a predefined lower level threshold, wherein the unauthorized activity with respect to the container is detected when there is a change in the temperature inside the container or there is a change in tilt angle of the lid of the container and a change in the level of the non-gaseous fluid substance in the container remains constant;

generate a graded alert based on the anomaly, by classifying the anomaly into one of a set of predefined alert categories;

determine a location of the container based on one of a sensing device identifier in the dataset, a Long Range (LoRA) signal based positioning technique, and location data from a global positioning system (GPS) sensor; and generate a map representing a shortest path to reach the container based on the graded alert and the location of the container.

10. The system of claim 9, wherein the sensing device is installed in an inner side of the lid of the container facing the non-gaseous fluid substance and comprises a plurality of sensors, and wherein the plurality of sensors comprises a millimetre wave radar to capture the level data, a temperature sensor to capture the temperature data, and an accelerometer or a tilt sensor to capture the movement data.

11. The system of claim 9, wherein the sensing device is a battery-operated device, and wherein the dataset further comprises battery condition data.

12. The system of claim 9, wherein the leakage is determined based on at least the level data, the contamination is determined based on the level data and at least one of the temperature data and the movement data, the unauthorized activity is determined based on at least the movement data, the drop in the level is determined based on at least the level data.

13. The system of claim 9, wherein the processor-executable instructions causes the processor to classify the anomaly into one of a set of predefined alert categories, wherein the set of predefined alert categories comprises at least a high alert category, an intermediate alert category, and a no alert category, and wherein classifying comprises:
   categorizing the anomaly into the high alert category based on at least one of the leakage, the contamination, or the drop in the level below the predefined lower level threshold;
   categorizing the anomaly into the intermediate alert category based on at least one of the unauthorized activity, and the drop in the level below the predefined upper level threshold but not below the predefined lower level threshold; and
   categorizing the anomaly into the no alert category when the anomaly is not determined or when the level is above the predefined upper level threshold.

14. The system of claim 9, wherein the processor-executable instructions further causes the processor to trigger the sensing device to increase a frequency of acquisition and transmission of the dataset from the preconfigured time-interval to a shorter preconfigured time-interval, upon classifying the anomaly into one of the high alert category or the intermediate alert category.

15. The system of claim 9, wherein the GPS sensor is a part of the sensing device or located in proximity to the container.

16. A non-transitory computer-readable storage medium storing computer-executable instructions for:
   receiving, from a plurality of sensors in a sensing device installed in a container, a dataset corresponding to the container and to a non-gaseous fluid substance in the container,
      wherein the dataset is acquired and transmitted by the sensing device at a preconfigured time-interval,
      wherein the dataset is generated by the sensing device by packing the level data, the temperature data, and the movement data based on a predefined data packing schema,
      wherein the sensing device transmits the dataset to the monitoring device via a Long Range (LoRa) wireless communication module,
      wherein the dataset comprises level data corresponding to a level of the non-gaseous fluid substance in the container, temperature data corresponding to a temperature inside the container, and movement data corresponding to movement of the container or a lid of the container, and
      wherein receiving the dataset comprises unpacking the dataset to extract the level data, the temperature data, and the movement data based on the predefined data packing schema using a light-weight client protocol; and
   performing a time-series analysis on the dataset for determining an anomaly, wherein the anomaly comprises at least one of a leakage in the container, a contamination of the non-gaseous fluid substance in the container, an unauthorized activity with respect to the container, a drop in the level of the non-gaseous fluid substance in the container below a predefined upper level threshold, or a drop in the level below a predefined lower level threshold, wherein the unauthorized activity with respect to the container is detected when there is a change in the temperature inside the container or there is a change in tilt angle of the lid of the container and a change in the level of the non-gaseous fluid substance in the container remains constant;
   generating a graded alert based on the anomaly, by classifying the anomaly into one of a set of predefined alert categories;
   determining a location of the container based on one of a sensing device identifier in the dataset, a Long Range (LoRa) signal based positioning technique, and location data from a global positioning system (GPS) sensor; and
   generating a map representing a shortest path to reach the container based on the graded alert and the location of the container.

* * * * *